United States Patent [19]
Barkay et al.

[11] 3,893,308
[45] July 8, 1975

[54] FREEZING APPARATUS PARTICULARLY USEFUL FOR FREEZING SPERMATOZOA

[75] Inventors: Joseph Barkay, Tiberias; Henryk Zuckerman, Afual; Nachman Pundak, En Harod (Ihud), all of Israel

[73] Assignee: Ricor, Ltd., En Harod (Ihud), Israel

[22] Filed: Mar. 13, 1974

[21] Appl. No.: 450,783

[30] Foreign Application Priority Data
Mar. 23, 1973    Israel................................ 41856

[52] U.S. Cl.................................. 62/223; 62/356
[51] Int. Cl.............................................. C12k 1/08
[58] Field of Search ....... 62/514, 516, 517, 62, 216, 62/217, 222, 223, 371, 388, 457, 356

[56] References Cited
UNITED STATES PATENTS

| | | | |
|---|---|---|---|
| 1,658,187 | 2/1928 | Dyer | 62/514 |
| 2,475,755 | 7/1949 | Pearson | 62/514 |
| 3,092,974 | 6/1963 | Haumann | 62/62 |
| 3,257,820 | 6/1966 | Case | 62/514 |
| 3,491,547 | 1/1970 | Watkins | 62/217 |
| 3,665,728 | 5/1972 | Stoller | 62/514 |

*Primary Examiner*—William E. Wayner
*Attorney, Agent, or Firm*—Benjamin J. Barish

[57] ABSTRACT

Freezing apparatus is described particularly useful for producing frozen pellets of a medium containing spermatozoa, for use in artificial insemination. The apparatus includes a freezing chamber having a heat-conductive removable freezing plate constituting the top wall of a compartment into which a cooling gas is fed from a liquified gas container. A valve in the gas feed line controls the amount of gas fed to the freezing chamber to produce a preselected temperature as preset by a controller, and an electrical heating element within the liquified gas container effects the drive of the gas from the container to the freezing chamber. The heat-conductive plate is formed with a plurality of recessed pockets in which the medium is introduced and freezes in the form of pellets.

8 Claims, 4 Drawing Figures

PATENTED JUL 8 1975    3,893,308

FREEZING APPARATUS PARTICULARLY USEFUL FOR FREEZING SPERMATOZOA

BACKGROUND OF THE INVENTION

The present invention relates to freezing apparatus. The invention is particularly useful for freezing media containing spermatozoa for use in artificial insemination (both human and animal), and therefore is described with respect to that application, but it will be appreciated that the invention could advantageously be used in other applications as well.

Various techniques have been devised for the freezing of spermatozoa for use in artificial insemination. One technique utilizes dry ice. Another technique uses containers containing ampules including the spermatozoa which ampules are placed over the vapors of liquid nitrogen. Such techniques, however, are inconvenient to practice and generally do not permit precise control of the temperature and/or rate of freezing. General purpose automatic freezing apparatus is sometimes used, but such apparatus is very expensive and is therefore not widely available.

SUMMARY OF THE PRESENT INVENTION

An object of the present invention is to provide freezing apparatus having advantages in the above respects.

More particularly, the present invention provides freezing apparatus including a freezing chamber having a heat-conductive, removable freezing plate supported therein above the bottom of the chamber to define a compartment between the plate and the chamber bottom. The freezing chamber is supported on top of a liquified gas container which includes a feed line conducting the gas into the mentioned compartment of the freezing chamber for cooling the heat-conductive freezing plate. The feed line further includes a valve which controls the feeding of the gas into the compartment, the valve being controlled by a controller which regulates the temperature of the compartment and of the heat-conductive freezing plate.

According to a further feature of the invention, the freezing plate is formed with a plurality of separate recessed pockets each receiving a separate portion of the medium to be frozen. The medium is frozen in the form of pellets.

According to a still further feature of the invention, the housing is of cylindrical shape, and the heat-conductive plate is of circular shape and is supported on the cylindrical side wall of the housing. The cylindrical housing is formed with threads at its upper end, receives an annular ring formed with mating thread at its lower end, the two threaded sections including shoulders clamping the heat-conductive freezing plate between them. The compartment receiving the cooling gas is filled with metal wool which provides a large cooling surface area for cooling the heat-conductive plate.

Further the compartment of the freezing chamber includes a temperature-sensitive device, and the controller includes temperature-presetting means responsive to the temperature of said device to control a valve in the feed-line or in the gas outlet of the freezing chamber to maintain the preset temperature in the freezing chamber.

In addition, the freezing chamber gas outlet has an adjustable valve for controlling the rate of exhaust of the gas from the compartment, and thereby the rate of cooling thereof.

Freezing apparatus constructed in accordance with the foregoing features has a number of advantages, particularly important when used for freezing spermatozoa. First, the apparatus involves a very simple operation and is available as and when needed; it takes only about three minutes to bring the freezing chamber up to the required temperature. In addition, the apparatus is of very simple, compact and low-cost construction, and therefore may be produced within the price range of small laboratories and hospitals and even private practices. Further, the freezing temperature can be fixed with substantially the same precision as the more expensive automatic equipment and can also be changed to provide any freezing rate or temperature desired. Still, further, the freezing plate on which the pellets are formed can be easily removed, used for transporting or storing the frozen pellets, and subsequently sterilized thus eliminating the problem of isolation and sterilization.

As noted above, while the invention is particularly useful for freezing spermatozoa (both human and animal), it could obviously be used in other applications to provide some or all of the foregoing advantages.

BRIEF DESCRIPTION OF THE DRAWINGS

The invention is herein described, for purposes of example only, with reference to the accompanying drawings, wherein.

DESCRIPTION OF THE PREFERRED EMBODIMENT

Figure 1:
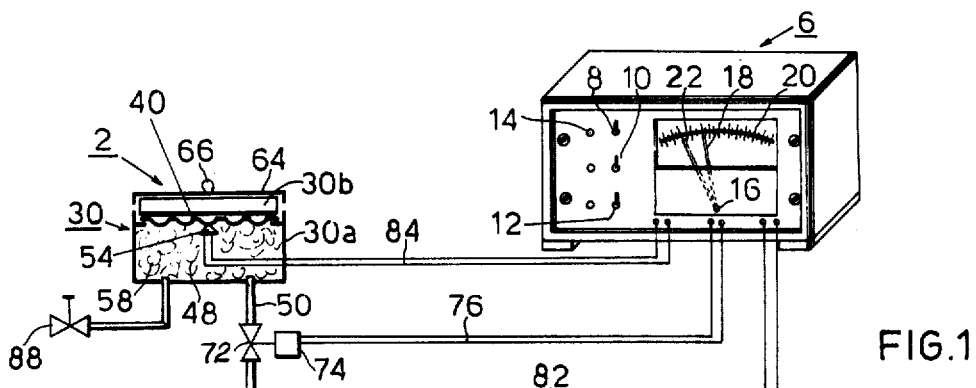
FIG. 1 illustrates one form of freezing apparatus constructed in accordance with the invention.

The freezing apparatus illustrated in the drawings is designed particularly for freezing media containing spermatozoa (both human and animal) for use in artificial insemination. The spermatozoa sample is contained in a liquid medium (e.g. one including glycerol, egg yolk, antibiotics, and a preservative such as sodium citrate) as known per se, and is frozen by the apparatus in the form of pellets.

The illustrated apparatus includes three main components, namely a freezing chamber 2, a container of liquid coolant gas 4, and a controller 6.

The controller includes three switches, namely a "Main" switch 8 for connecting the apparatus to the power supply, a "Pressure" switch 10 for initiating the flow of the coolant gas from container 4 to the freezing chamber 2, and a "Cool" switch 12 which controls the cooling operation. The controller further includes a manual knob 16 which moves a needle 18 over a scale 20 to preset any desired freezing temperature. A further needle 22 is movable over the same scale and measures the actual temperature within the freezing chamber 2.

Figure 2:
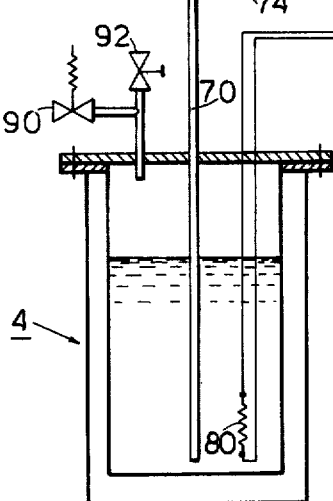
FIG. 2 is an enlarged view, partly in section, of the freezing chamber in the apparatus of FIG. 1.
Figure 2:
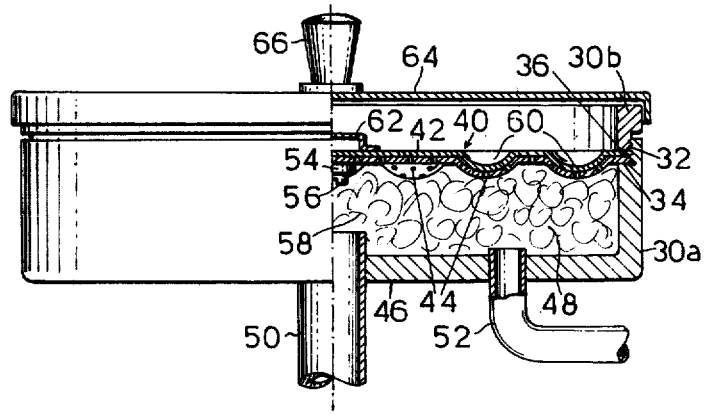

The freezing chamber 2 is in the form of a cylindrical housing 30 and includes a lower cylindrical section 30a formed with threads 32 at its upper end, for receiving an upper annular locking ring 30b formed with mating threads at its lower end. The housing and ring include shoulders 34, 36 (see FIG. 2) for clamping a circular plate 40 between them when the two are threaded together.

Plate 40 is a heat-conductive freezing plate and is a composite of an upper, continuous metal sheet 42 and an underlying perforated metal sheet 44 bonded thereto.

The freezing plate 40, when clamped between shoulders 34, 36 of the housing and locking rings, is spaced above the bottom 46 of the freezing chamber. This defines a cylindrical compartment 48, the top of which is constituted by the freezing plate 40, and the bottom of which is constituted by the bottom 46 of freezing chamber. This compartment 48 includes an inlet 50 and an outlet 52 and further includes a temperature sensitive device 54 secured to the freezing plate 40 by means of a screw 56. Compartment 48 is filled with metal wool 58.

The removable freezing plate 40 is formed with a plurality of recessed pockets 60 each for receiving a portion of the medium to be frozen. In the described embodiment, the recessed pocket 60 are in the form of spherical dimples. The upper surface of the plate is suitably coated by a repellant anti-sticking material so that when the liquid medium is introduced into the pockets, the medium will assume the shape of pellets which will not stick to the plate after freezing. The center of plate 40 includes a finger-grippingn stem 62 fastened thereto, to facilitate the manual removal and transport of the plate. finger-gripping The top of the freezing chamber is closed by a removable lid 64 including a grasping knob 66.

The inlet 50 of the freezing chamber is coupled to a feed-line 70 (FIG. 1) extending into the liquified gas container 4. Freezing chamber 2 is supported directly on top of the liquified gas container 4 by means of this feed-line. If desired, other support means may be provided, in addition to or in lieu of feed-line 70. This feed line includes a solenoid valve 72 which controls the flow of the coolant gas from the container into compartment 48 of the freezing chamber. Valve 72 is operated by a coil 74, the energization of which is controlled by controller 6 via electrical conductors 76.

The liquified gas container 4 further includes an electrical heating element 80, the electrical power to which is also controlled by controller 6 via conductors 82. The controller 6 further includes electrical conductors 84 leading to the temperature-sensitive element 54 within compartment 48 of the freezing chamber.

Outlet 52 from compartment 48 includes a valve 88 which may be varied by an adjusting element to preset the rate of exhaust of the gas from compartment 48. The liquified gas container 4 includes a release valve 90 and a vent valve 92.

The apparatus illustrated is used in the following manner:

First, switches 8, 10 and 12 of the controller are turned on, and knob 16 is rotated to preset temperature needle 18 to the desired freezing temperature. Switch 8 controls the main power to the apparatus, and switch 10 controls the power supplied to heater 80 in the liquified gas container 4. When the latter heater is energized, pressure is built up within the container, forcing the gas therein through the feed-tube 70 into compartment 48 of the freezing chamber. Switch 12 energizes coil 74 of solenoid valve 72, opening the valve to permit the coolant gas to be fed through tube 70 into compartment 48.

As the coolant gas flows into compartment 48, the temperature therein lowers, this being sensed by temperature sensitive device 54 in the compartment and indicated by needle 22 of the controller. As soon as the temperature within the compartment reaches that preset by needle 18, the controller automatically energizes coil 74 to close valve 72 to block the further inflow of coolant gas.

It takes about 2-3 minutes before compartment 48, and the removable freezing plate 40 therein, reach the desired temperature (e.g. −75°C), this rate being variable by adjusting outlet valve 88 to vary the rate of exhaust of the gas from compartment 48.

When the desired temperature is reached, lid 64 is removed, and the medium to be frozen is introduced drop-by-drop into the recesses 60 of the freezing plate 40. It only takes a few seconds before the medium is frozen in the form of pellets. The frozen pellets may then be removed from plate 40, e.g. by a plastic spoon; or the whole plate may be removed by unthreading annular ring 30b and grasping the finger-gripping stem 62, whereby the plate including the pellets may be transported to a canister or other container for deep-freezing (e.g. to a temperature of 196°C), or for other processing or for storage.

Circuit details of the controller 6 are not described herein since such circuits are known and available to those skilled in the art. Thus, the switch 8 may be a conventional switch for controlling the power supply, and switch 10 may likewise be a conventional switch for controlling the power to heating element 80. In addition, circuits are known which can be used to enable the temperature-sensing element 54 to control valve 72 such that the valve is open to continue the cooling whenever the sensed temperature is above that preset by knob 16 of the controller, and the valve is closed to terminate the cooling whenever the temperature is equal to or below that preset by knob 16.

For purposes of example, the liquified coolant gas container 4 may be a 2.5 liter container of liquid nitrogen, this being sufficient for about 3 hours of use. The apparatus may be adjustable to provide any desired temperature between +15°C down to −120°C. The removable freezing plate 40 may be a composite of an upper stainless steel sheet 42 and an underlying copper screen 44.

Figure 4:
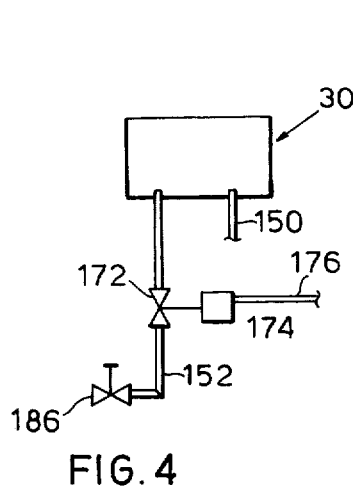
FIG. 4 illustrates a variation.
Figure 3:
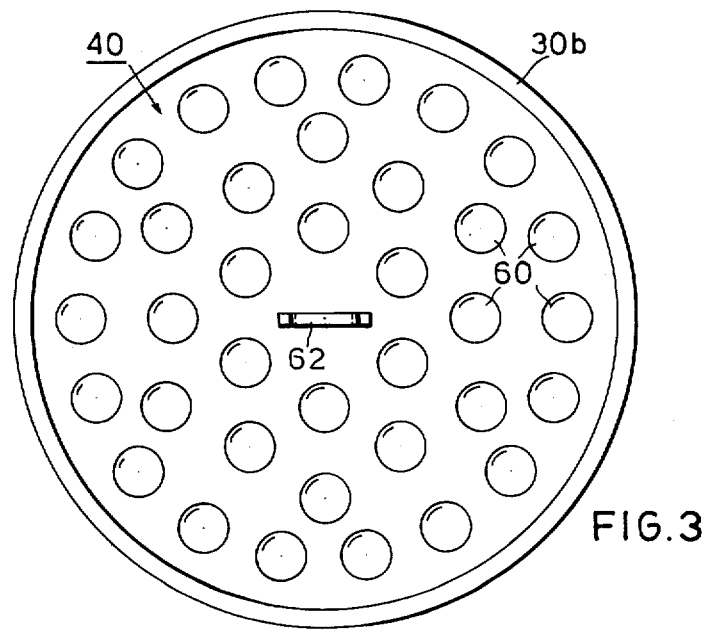
FIG. 3 is a top plan view of the heat-conductive freezing plate on which the pellets are formed.

Many variations may be included. FIG. 4 illustrates one in which the temperature control valve 172, controlled by the temperature-sensitive element via line 176 and coil 174, is in the chamber outlet 152 rather than in the feed-line inlet 150. Also, instead of threads 32, other fastening means may be used for fastening the locking ring 30b to the housing, for example bayonette pins and slots.

Many other variations, modifications, and applications of the illustrated embodiment may be made.

What is claimed is:

1. Freezing apparatus particularly useful for producing frozen pellets of a liquid medium containing spermatozoa frozen at a preselected temperature, comprising: a housing closed at the bottom and open at the top; a removable, heat-conductive, freezing plate resting on the top of the container and closing same to define a freezing chamber therewith; said freezing plate being formed with a plurality of recessed circular pockets each for receiving a portion of the liquid medium to be frozen into pellets, said freezing plate being removable with the frozen pellets from the housing; said chamber having an inlet and an outlet for introducing and removing a coolant gas; a temperature-sensitive device disposed within said freezing chamber; a container containing a coolant liquified gas and including an inlet line connected to said chamber inlet; an outlet line connected to said chamber outlet; a valve included in one of said lines for controlling the flow of coolant gas to the freezing chamber; a controller including a temperature presetting device; and means responsive to the temperature-sensitive device in the freezing chamber for controlling said valve, and thereby the temperature of the freezing chamber, in accordance with the temperature presetting device.

2. Apparatus as defined in claim 1, wherein said removable freezing plate includes a finger-gripping member facilitating the removal of the plate and the frozen pellets formed thereon.

3. Apparatus as defined in claim 1, wherein said housing is of cylindrical shape and the removable freezing plate is of circular shape.

4. Apparatus as defined in claim 3, wherein said housing includes a removable upper annular ring removably fastened to the upper end of the housing to clamp the circular freezing plate between it and the upper end of the housing.

5. Apparatus as defined in claim 1, wherein the freezing chamber is filled with metal wool providing a large cooling surface area for cooling the freezing plate.

6. Apparatus as defined in claim 1, wherein said removable freezing plate is coated with repellant material to facilitate the formation of the frozen pellets within its plurality of recessed pockets.

7. Apparatus as defined in claim 1, wherein said removable freezing plate is constituted of an upper metal sheet and an underlying perforated metal sheet bonded thereto, and wherein said freezing chamber includes a removable lid spacedly overlying the freezing plate.

8. Apparatus as defined in claim 1, wherein said removable freezing plate is constituted of an upper metal sheet and an underlying perforated metal sheet bonded thereto.

* * * * *